United States Patent
Meng

(10) Patent No.: US 10,203,982 B2
(45) Date of Patent: Feb. 12, 2019

(54) MOBILE-PHONE UX DESIGN FOR MULTITASKING WITH PRIORITY AND LAYERED STRUCTURE

(71) Applicant: TCL RESEARCH AMERICA INC., San Jose, CA (US)

(72) Inventor: Di Meng, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 111 days.

(21) Appl. No.: 15/395,970

(22) Filed: Dec. 30, 2016

(65) Prior Publication Data
US 2018/0189099 A1    Jul. 5, 2018

(51) Int. Cl.
| | |
|---|---|
| G06F 3/048 | (2013.01) |
| G06F 9/48 | (2006.01) |
| G06F 3/16 | (2006.01) |
| H04M 1/725 | (2006.01) |

(52) U.S. Cl.
CPC ........... *G06F 9/4831* (2013.01); *G06F 3/167* (2013.01); *G06F 9/4881* (2013.01); *H04M 1/72583* (2013.01); *H04M 1/72522* (2013.01); *H04M 1/72586* (2013.01)

(58) Field of Classification Search
CPC .......................................... G06F 3/03–3/1263
USPC ....................................................... 715/789
See application file for complete search history.

(56) References Cited

U.S. PATENT DOCUMENTS

| | | | | |
|---|---|---|---|---|
| 5,889,517 A * | 3/1999 | Ueda | .................. | G09G 5/14 |
| | | | | 715/803 |
| 6,961,906 B2 * | 11/2005 | Hansen | ............... | G06F 3/03543 |
| | | | | 345/157 |
| 7,028,264 B2 * | 4/2006 | Santoro | ................. | G06F 3/0481 |
| | | | | 715/729 |
| 7,376,907 B2 * | 5/2008 | Santoro | ................. | G06F 3/0481 |
| | | | | 715/729 |
| 8,174,617 B2 * | 5/2012 | Lee | .......................... | G09G 5/14 |
| | | | | 348/563 |
| 8,302,026 B2 * | 10/2012 | Wang | ..................... | G06F 3/0481 |
| | | | | 715/769 |
| 8,600,446 B2 * | 12/2013 | Chiang | ................. | G06F 3/0483 |
| | | | | 455/414.1 |
| 8,633,900 B2 * | 1/2014 | Jin | ......................... | G06F 3/0482 |
| | | | | 345/173 |
| 9,128,544 B2 * | 9/2015 | Chun | ...................... | G06F 3/041 |
| 9,134,876 B2 * | 9/2015 | Kano | .................... | G06F 3/0481 |
| 9,158,494 B2 * | 10/2015 | Sirpal | .................... | G06F 3/1438 |
| 9,652,111 B2 * | 5/2017 | Ho | ......................... | G06F 3/0489 |
| 9,696,888 B2 * | 7/2017 | Deutsch | .............. | G06F 3/04842 |
| 9,712,472 B2 * | 7/2017 | Mital | ..................... | H04L 51/02 |

(Continued)

*Primary Examiner* — Francisco J Aponte
(74) *Attorney, Agent, or Firm* — Anova Law Group, PLLC

(57) ABSTRACT

The present disclosure provides a method for improving mobile-phone user experience (UX) design for multitasking with priority and layered structure, including: receiving data for opening a task; determining a priority ranking of the task; and executing the task and displaying the task on one of at least a portion of a screen area and in a task menu based on the priority ranking of the task. When a number of opened tasks is at least two, the opened tasks includes a major task having a highest priority ranking and a plurality of minor tasks having lower priority rankings, the major task being executed and displayed on at least a larger portion of the screen area.

17 Claims, 11 Drawing Sheets

(56) References Cited

U.S. PATENT DOCUMENTS

| | | | |
|---|---|---|---|
| 9,857,935 B2* | 1/2018 | Jeong | G06F 9/4443 |
| 9,891,965 B2* | 2/2018 | Hong | G06F 9/542 |
| 9,910,884 B2* | 3/2018 | Churchill | G06F 17/30386 |
| 2004/0095401 A1* | 5/2004 | Tomimori | G06F 9/451 |
| | | | 715/864 |
| 2005/0108655 A1* | 5/2005 | Andrea | G06F 9/451 |
| | | | 715/798 |
| 2007/0226647 A1* | 9/2007 | Louch | G06F 9/451 |
| | | | 715/788 |
| 2008/0177522 A1* | 7/2008 | Bolding | G06F 17/5009 |
| | | | 703/13 |
| 2009/0298418 A1* | 12/2009 | Michael | H04H 60/31 |
| | | | 455/3.04 |
| 2010/0088634 A1* | 4/2010 | Tsuruta | G06F 3/0481 |
| | | | 715/800 |
| 2011/0210922 A1* | 9/2011 | Griffin | G06F 1/1624 |
| | | | 345/173 |
| 2013/0120447 A1* | 5/2013 | Kim | G06T 11/60 |
| | | | 345/629 |
| 2013/0290887 A1* | 10/2013 | Sun | G06F 3/0482 |
| | | | 715/769 |
| 2013/0300684 A1* | 11/2013 | Kim | G06F 3/0488 |
| | | | 345/173 |
| 2013/0305184 A1* | 11/2013 | Kim | G06F 3/0481 |
| | | | 715/781 |
| 2014/0089833 A1* | 3/2014 | Hwang | G06F 3/04817 |
| | | | 715/769 |
| 2014/0164966 A1* | 6/2014 | Kim | G06F 3/04886 |
| | | | 715/769 |
| 2014/0258916 A1* | 9/2014 | Laycock | G05B 19/042 |
| | | | 715/781 |
| 2014/0320391 A1* | 10/2014 | Bazaz | H04W 52/0277 |
| | | | 345/156 |
| 2014/0365933 A1* | 12/2014 | Wu | G06F 3/04817 |
| | | | 715/769 |
| 2015/0186024 A1* | 7/2015 | Hong | G06F 9/542 |
| | | | 715/800 |
| 2016/0134925 A1* | 5/2016 | Lee | H04N 5/4403 |
| | | | 725/32 |
| 2016/0366255 A1* | 12/2016 | Chu | H04M 1/0283 |
| 2018/0165005 A1* | 6/2018 | Kwon | G06F 3/04886 |

* cited by examiner

MOBILE-PHONE UX DESIGN FOR MULTITASKING WITH PRIORITY AND LAYERED STRUCTURE

FIELD OF THE INVENTION

The present invention generally relates to computer technologies and, more particularly, relates to a mobile-phone user experience (UX) design for multitasking with priority and layered structure.

BACKGROUND

Multitasking on mobile devices is a preferred and needed feature in today's mobile devices, especially mobile devices with small screens and have functions such as navigation, messaging, phone calls, conference calls, searching for points of interests (e.g., parking and gas stations), etc. A mobile device having multitasking functionalities, e.g., a smart phone, enables the user to rapidly switch between different applications and access information from various information sources.

However, it is often difficult to implement multitasking on a conventional mobile device because the screen size of a conventional mobile device is often small, which limits the users' ability to see content of different applications/tasks at the same time or impairs the user experience when multiple tasks are shown on the screen. Currently, mobile devices allow multiple tasks to run in the background, a user can browse and choose one application at a time to run, while the operating system focuses mostly on switching between applications. This increases the memory load of the mobile device. Further, few mobile platforms and applications provide the capability of split screens to simultaneously view and operate more than one application. As a result, switching between different applications on a conventional mobile device requires a more demanding configuration of the mobile device, i.e., the software and the hardware, which may increase the cost of the mobile device.

The disclosed methods and systems are directed to solve least partial problems set forth above and other problems.

BRIEF SUMMARY OF THE DISCLOSURE

The present invention addresses the above problems in the prior art. The present disclosure provides a mobile-phone UX design for multitasking with priority and layered structure. The disclosed system and method used for the UX design allow the mobile device to perform a major task and a first-level minor task at the same time. Meanwhile, the mobile device may send notification messages on the status of the second-level minor tasks to allow the user to respond accordingly. Thus, the mobile device may execute and display multiple tasks at the same time and the user may not need to switch between different tasks. User experience may be improved and the screen area of the mobile device may be more efficiently used.

One aspect of the present disclosure provides a method for improving mobile-phone user experience (UX) design for multitasking with priority and layered structure, including: receiving data for opening a task; determining a priority ranking of the task; and executing the task and displaying the task on one of at least a portion of a screen area and in a task menu based on the priority ranking of the task. When a number of opened tasks is at least two, the opened tasks includes a major task having a highest priority ranking and a plurality of minor tasks having lower priority rankings, the major task being executed and displayed on at least a larger portion of the screen area.

Another aspect of the present disclosure provides a system for improving mobile-phone user experience (UX) design for multitasking with priority and layered structure, including a memory processor configured for: receiving data for opening a task; determining a priority ranking of the task; and executing the task and displaying the task on one of at least a portion of a screen area and in a task menu based on the priority ranking of the task. When a number of opened tasks is at least two, the opened tasks includes a major task having a highest priority ranking and a plurality of minor tasks having lower priority rankings, the major task being executed and displayed on at least a larger portion of the screen area.

Another aspect of the present disclosure provides a non-transitory computer-readable medium containing executable computer program for, when being executed by a memory processor, improving mobile-phone user experience (UX) design for multitasking with priority and layered structure, the method for multitasking including: receiving data for opening a task; determining a priority ranking of the task; and executing the task and displaying the task on one of at least a portion of a screen area and in a task menu based on the priority ranking of the task. When a number of opened tasks is at least two, the opened tasks includes a major task having a highest priority ranking and a plurality of minor tasks having lower priority rankings, the major task being executed and displayed on at least a larger portion of the screen area.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
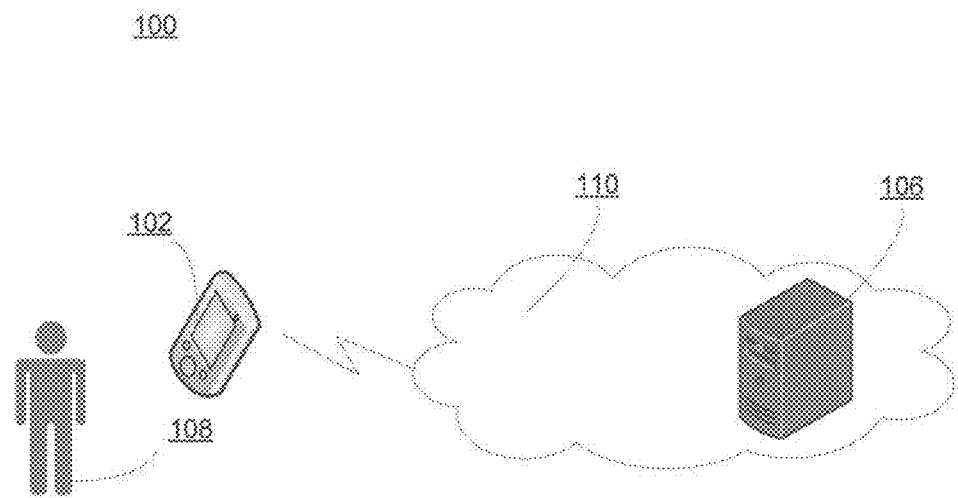
FIG. 1 illustrates an exemplary environment incorporating various disclosed embodiments of the present disclosure.

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

In the history of display, such as TVs and computers, major and minor views have been used broadly as a standard function to provide user a thumbnail view on what is on another program. User can make a choice by relying on the minor view. The feature is also used in video conference and health monitoring scenarios/applications when major and minor screens are displayed to help the user make quick and accurate decision without using a great amount of additional cognitive resources.

However, above implementations with prioritized task views cannot happen or be effective without utilizing large-size displays and hardware capability. Both can be barriers for mobile phone or any devices with limited-size display screens.

All functions in mobile are accessible through elements, i.e., applications in existing mobile devices. When operating different tasks, a user has to switch among applications that exist in parallel by viewing and conducting one task/application at a time. That means, obviously, the user loses the view and control capability of the other tasks. Further, there is no system recognition among applications of which task is a major task, such as driving and watching a show, e.g., that requires minimal interruption. When a minor task is needed, the major task is interrupted, e.g., removed from the screen, to operate the minor task, such as picking up a phone call or replying to a message.

On the other side, it is not easy for the user to access another task when a major task is ongoing, e.g., searching a movie when another movie is being displayed or making a phone call while watching the navigation map.

To solve these problems, the present disclosure combines views of the major task with one minor task along with the control menu/task menu. Accordingly, a user can operate on a minor task while the major task as the highest priority is ongoing. Meanwhile, the user can also easily access different minor task(s) that have lower priorities when they are on demand from the task menu.

The nature of multitasking facilitated by different device media in the modern society requires the system design for both devices and applications to bring users the maximum capacity to operate as many functions as possible, to ensure the human-machine interaction efficiency and sound usability, as well as accuracy and safety in many senses.

From this aspect, it may be desired to prioritize the tasks into major and layered minor tasks to help the user focus without being randomly distracted by tasks at the same priority level. In addition, the minor tasks can have two levels or two priority levels. When a minor task of a higher priority level is in the view, a task of a lower priority level can alert the user when it has certain updates or information on the status, for user to react or acknowledge. For example, a user can be driving in an urban area with navigation function ongoing while on a call with a friend, and a message comes in at the same time. The disclosed UX design allows the major task of navigation, having a higher priority level, to be in the view with the call. The call is a minor task having a lower priority level than the navigation. Meanwhile, the user is notified of the receipt of the new message. Of course, the disclosed UX design can be applied to other multitasking environments in addition to mobile phones.

Thus, currently, it may be difficult to implement multitasking on a conventional mobile device because of the screen size and the requirements on the software and the hardware of the mobile device. A user using a conventional mobile device often need to turn on more than one task and switch between tasks. Because of the limited screen size of the mobile device, a conventional mobile device may only be able to display one task. When switching to another task, the mobile device may only be able to display the other task. As a result, the user may be interrupted from the task being displayed when anther task needs the user's action, and the user experience may be impaired. Further, a conventional mobile device may utilize a considerable amount of resources on switching between applications/tasks, and this results a demanding requirement on the software and the hardware of the mobile device. Accordingly, the cost of the mobile device may be high.

The present disclosure provides a system and a method for a mobile-phone UX design for multitasking with priority and layered structure. This disclosed UX design provides a context-sensitive and customizable solution to allow the user to conduct a major task along with minor tasks. In addition, the UX design informs the user the status of other minor tasks (such as an incoming phone call or a new message) when the major task and a minor task are ongoing at the same time. It enables any applications to provide multiple sources of information within one view (i.e., one screen) so that a user can easily make decision without deviating from the major task and going back and forth among different applications. The disclosed UX design, with prioritized tasks with layered structure user interface (UI), provides a solution to a mobile phone design challenge of handling multitasking with limited resources and capability, as well as helping user deal with multiple tasks without losing the focus and decision making on the tasks with higher priority.

According to the present disclosure, the priority of a task may be ranked in the mobile device and a major task, having a highest priority, may be selected to be operated and displayed in larger portion, e.g., greater than a half, of the screen. Meanwhile, a first-level minor task, having a lower priority, may be operated and displayed in a smaller portion of the screen, and notification messages from a second-level minor task, having the lowest priority, may be displayed to the user. The disclosed system and method for the UX design may provide a layered structure or a ranking of priorities of different tasks, providing a solution to the challenge of multitasking in a mobile device of limited screen size and capacity. The mobile device may display at least two tasks at the same time and the user may be notified if a third task generates a notification. Thus, the user may be uninterrupted from a task when other tasks are also running, and the user experience may be improved.

Figure 2:
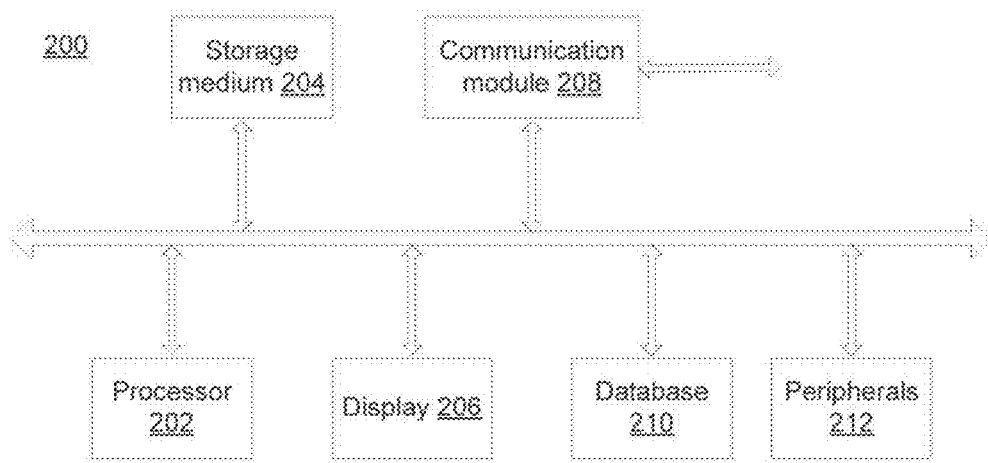
FIG. 2 illustrates a block diagram of an exemplary control unit used in various disclosed embodiments of the present disclosure.

FIG. 1 illustrates an exemplary operating environment incorporating the embodiments of the present disclosure. FIG. 2 illustrates a block diagram of an exemplary control unit used in embodiments of the present disclosure.

As shown in FIG. 1, the operating environment 100 may include a terminal 102, a server 106, a user 108 and a network 110. Certain device(s) may be omitted and other devices may be added. A user 108 may operate terminal 102 for certain services provided by server 106. Although only one server 106 and one terminal 102 is shown in the environment 100, any number of terminals 102 or servers 106 may be included, and other devices may also be included.

Terminal 102 may refer to any appropriate user terminal with certain computing capabilities, such as a personal computer, a hand-held computing device (tablet), a smart device or mobile device, or any other user-side computing device. Terminal 102 may be implemented on any appropriate computing platform. Terminal 102 may be used by user 108 to connect to network 110 and make requests to server 106 via a webpage, an app or other interfaces. For example, user 108 may use terminal 108 to visit a website hosted by server 106 for sharing and trading activities, such as renting a room, selling a used item, etc.

Server 106 may refer to one or more server computers configured to provide certain server functionalities (e.g., hosting a website, conducting a search, processing data), such as data query and computation tasks. Server 106 may include one or more processors to execute computer programs in parallel. Server 106 may store data (e.g., item descriptions) to be accessed by terminals 102. For example, server 106 may host an app and/or a website to facilitate sharing and trading activities between users 108, such as providing an interface for a seller to post an item, an interface for a buyer to search and browse items, a mechanism for buyers and sellers to communicate, a mechanism to complete buying or selling transactions, etc.

Although server 106 is shown in a single computer configuration, more computers or server clusters can be included in server 106. Server 106 may provide cloud-based services in a cloud computing environment, i.e., the use of computing resources (hardware and software) that are delivered as a service over a network infrastructure (e.g., the Internet). The cloud computing environment may include any private cloud configuration and/or public cloud configuration. Various servers 106 (i.e., server services) in the cloud may be configured to provide data storage and computation functionalities (e.g., training and utilizing a time-value model).

Terminal 102 and server 106 may communicate with each other through communication network 110, such as the Internet or other types of computer networks or telecommunication networks, either wired or wireless, such as a cable network, a phone network, and/or a satellite network, etc.

Terminal 102 and/or server 106 may be implemented on any appropriate computing circuitry platform.

FIG. 2 shows a block diagram of an exemplary computing system/control unit 200 capable of implementing terminal 102 and/or server 106.

The control unit 200 used in the embodiments of the present disclosure may be configured to control the operation and functions of different devices in the system. As shown in FIG. 2, control unit 200 may include a processor 202, a storage medium 204, a display 206, a communication module 208, a database 210 and peripherals 212. Certain devices may be omitted and other devices may be included.

Processor 202 may include any appropriate processor or processors. Further, processor 202 can include multiple cores for multi-thread or parallel processing. Processor 202 may execute sequences of computer program instructions to perform various processes. Storage medium 204 may include memory modules, such as ROM, RAM, flash memory modules, and mass storages, such as CD-ROM and hard disk, etc.

Storage medium 204 may store computer programs for implementing various processes when the computer programs are executed by processor 202, such as computer programs for rendering graphics for a UI, implementing a face recognition process, etc. Storage medium 204 may store computer instructions that, when executed by the processor 202, cause the processor to generate images for multiple tasks. The computer instructions can be organized into modules to implement various calculations and functions as described into the present disclosure.

Further, communication module 208 may include certain network interface devices for establishing connections through communication networks. Database 210 may include one or more databases for storing certain data and for performing certain operations on the stored data, such as database searching. Further, the database 210 may store images, videos, personalized information about the user 108, such as preference settings, favorite programs, user profile, etc., and other appropriate contents.

Display 206 may provide information to a user or users of TV 102. Display 206 may include any appropriate type of computer display device or electronic device display such as CRT or LCD based devices. Display 206 may also implement display technologies for creating graphical display effects of input contents. Peripherals 212 may include various sensing devices and other I/O devices, such as body sensing device, motion sensing device, microphones, cameras, etc.

When in operation, the terminal 102, with or without the server 106, may implement a UX design for multitasking with priority and layered structure. A mobile device (e.g., terminal 102) may execute multiple tasks at the same time and display contents of the on-going tasks to a user so that the user may view contents of different applications. Thus, it may be easier for the user 108 to control the mobile device to obtain the desired information, and the user 108 may obtain information from different applications/sources at the same time.

For example, when the user 108 types in a command or respond to a notification from an application on the mobile device, the mobile device may rank the priorities of certain tasks and display the tasks on proper portions of the display 206. The mobile device may utilize various technologies in computer graphics, computer simulation, artificial intelligence, sensing device technologies, display technologies, and parallel processing, etc., to implement desired functions.

In an exemplary embodiment, the user 108 may select an application or a task to be operated on the mobile device. The terminal 102 may sense the user's activity and send signals reflecting the user's activity to the control unit 200 through the communication module 208. The processor 202 may respond to user's commands and respond accordingly, e.g., performing certain calculations and sending the results of the calculations to the display 206, such that the display 206 may display the results to the user. Data used for the calculation may be obtained in real-time, the storage medium 204 and/or the database 210. The communication module 208 and/or the display 206 may also play back audios in response to the user's commands.

In various embodiments, the method and system for the UX design provided by the present disclosure may also be applied in other suitable computer systems, e.g., smart TVs.

In various embodiments, the tasks may include, but not limited to, applications on the mobile device. The tasks can also be other suitable computer programs that can be operated in the mobile device to implement certain functions. For example, the tasks can be functions embedded in the operating system of the mobile device.

The user may select a task or an application on the mobile device, and the task may be executed and displayed on the mobile device. When there is only one task being executed, the task may be displayed in full-screen. Other tasks may be arranged or aligned in the task menu such that the user may browse and navigate the tasks in the task menu to further select/open another task when desired. In one embodiment, when there is only one task to be executed, the task may be a major task.

The user may send commands to the mobile device through any suitable ways. In some embodiments, the user may type in the name of a task on the mobile device. In some embodiments, the mobile device may include touch functions and the user may touch the screen to select a task. In some other embodiments, the mobile device may include voice control and the user may talk to the mobile device to select/open a task. The mobile device may also respond to updates and/or activities of a task, e.g., an incoming call, that require user's action to open the task. Other ways to open a task may also be used.

In certain embodiments, the mobile device has a default priority ranking of different tasks. The tasks with the same priority rankings may form a layer, and the tasks in the mobile device may form multiple layers. In various embodiments, the user may be able to modify the settings in the mobile device such that customized or user-defined priority rankings or layers of different tasks may be determined. With such priority rankings, one or more tasks may be determined as major tasks, one or more tasks may be determined as first-level minor tasks, and the rest of the tasks may be determined as second-level minor tasks. The major tasks may correspond to a same layer, the first-level minor tasks may correspond to a same layer, and the second-level minor tasks may correspond to a same layer. The tasks in a same layer may be operated in a similar way.

Thus, a user may conduct a major task and simultaneously interact with a minor task. The UI and controls for both major and minor tasks are in one UI view. The user is able to interact with the task that has a higher priority without losing the view a task with lower priority is ongoing. User also doesn't need to switch back and forth among applications/tasks to collect information and make decisions, which would require more resources from the user with increased cognitive workload.

Figure 10:
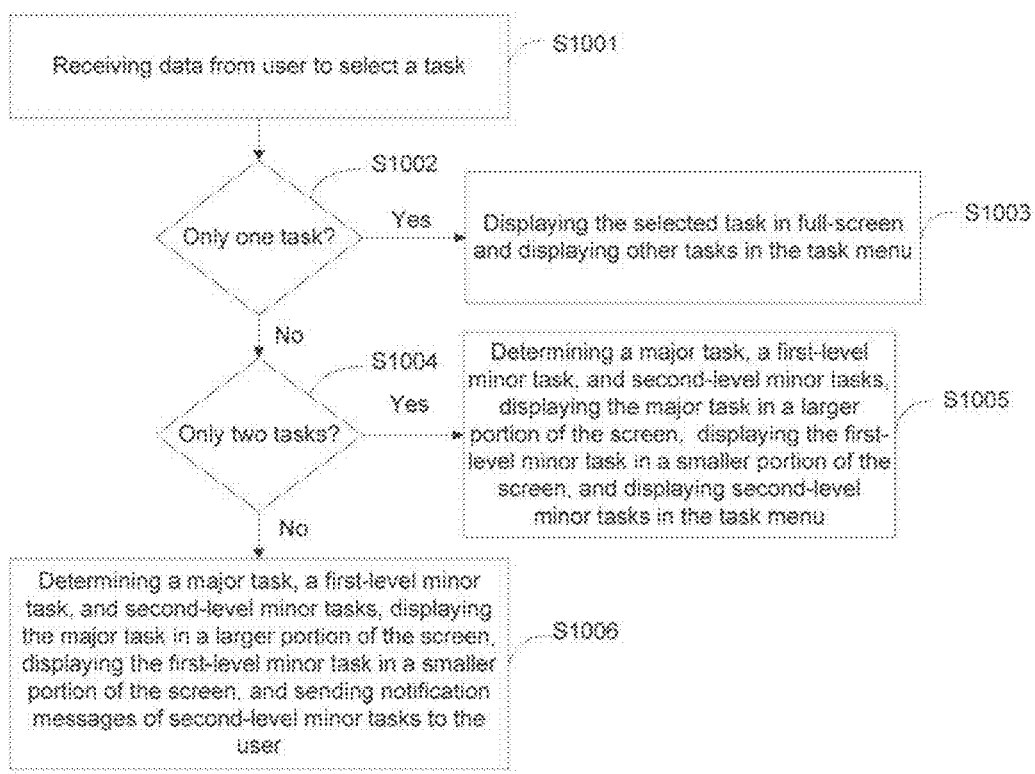
FIG. 10 illustrates an exemplary flow chart of an operation consistent with various disclosed embodiments of the present disclosure.

For example, a major task, having the highest priority, may be executed and displayed in full-screen or in a larger portion of the screen area; a first-level minor task, having a lower priority, may be executed and displayed in a smaller portion of the screen area; and a second-level minor task, having the lowest priority, may be arranged in a task menu. The priority ranking of a task may be used to determine the portion of screen area for displaying the task. The mobile device may further include an algorithm to determine the priority ranking of a task when receiving data from the user or a task. FIG. 10 illustrates an exemplary process of such an algorithm to determine tasks of different priority rankings or layers.

As shown in FIG. 10, in step S1001, the mobile device may first receive data. The data may contain commands to select a task. The data may be from the user or from a task. For example, the user may select a task or a task may generate a notification message that requires user's action, e.g., to select, open, or respond to a task.

In step S1002, the mobile device may determine if the task selected by the user is the only task to be executed. If the selected task is the only task to be executed, the program may proceed to step S1003. If the selected task is not the only task to be executed, the program may proceed to step S1004.

In step S1003, the selected task may be displayed in full-screen of the mobile device.

In step S1004, the mobile device may determine if only two tasks are to be executed. If only two tasks are to be executed, the program may proceed to step S1005. If more than two tasks are to be executed, the program may proceed to step S1006.

In step S1005, the mobile device may determine a major task, a first-level minor task, and second-level minor tasks, display the major task in a larger portion of the screen, display the first-level minor task in a smaller portion of the screen, and display second-level minor tasks in the task menu.

In step S1006, the mobile device may determine a major task, a first-level minor task, and second-level minor tasks, display the major task in a larger portion of the screen, display the first-level minor task in a smaller portion of the screen, and send notification messages of second-level minor tasks to the user.

That is, when a task is selected to be executed or an application is selected to be opened, the mobile device may determine the priority of the task. If only one task is selected, regardless of the priority of the task, the task may be executed and displayed in full-screen. Other tasks may be displayed in the task menu for the user to browse and choose. When the user selects only two tasks or chooses to open two applications, the mobile device may determine the priorities of the two tasks. One of the tasks may be the major task and the other task may be a first-level minor task.

The major task may be displayed in a larger portion of the screen area and the first-level minor task may be displayed in a smaller portion of the screen area, at the same time. Icons of the first-level minor task and the second-level minor tasks may be displayed in the task menu. When more than two tasks are selected to be opened, the mobile device may determine the priority rankings of the tasks.

One of the tasks may be the major task and another task may be a first-level minor task, and the rest of the selected tasks may be the second-level minor tasks. The major task may be displayed in a larger portion of the screen area and the first-level minor task may be displayed in a smaller portion of the screen area, at the same time. Icons of the first-level minor task and the second-level minor tasks may be displayed in the task menu and notification messages of the second-level minor tasks may be sent to the user or displayed on the screen, when the major task and the first-level minor task are being executed and displayed.

In some embodiments, the mobile device may compare each task selected by the user to the priority rankings stored in the mobile device, and determine a major task, a first-level minor task, and second-level minor tasks.

In some other embodiments, the priority of a task may be determined based on the order it is selected. For example, a task that is selected first by the user may be the major task, and the task selected later by the user may be first-level minor task. The tasks selected after the major task and the first-level minor task may be the second-level minor tasks.

In some embodiments, when there are only two selected tasks to be executed, the rest of the tasks or applications may be the second-level minor tasks. Notification messages of the second-level minor tasks may be sent to the user when the major task and the first-level minor task are being executed. In some other embodiments, when there are only two selected tasks to be executed, only certain tasks or applications, defined by the priority rankings or by the user, may be displayed in the task menu.

In some embodiments, when there are more than two selected tasks to be executed, only the selected tasks, except for the major task, may be displayed in the task menu. In some embodiments, when there are more than two selected tasks to be executed, a task selected later may replace a previously-selected major task or a first-level minor task to become a new major task or a first-level minor task. In some other embodiments, when there are only two selected tasks to be executed, all the other tasks or applications, may be the second-level minor tasks and may be displayed in the task menu. The criteria to determine the priority ranking of a task should be determined according to different applications and designs and should not be limited by the embodiments of the present disclosure.

In some embodiments, the user may close a task, e.g., a major task or a first-level minor task. The user may also decline a notification message from a second-level minor task. The action to close a task or decline a notification message may also be sent to the mobile device as corresponding data, and the data may be processed from step S1001. That is, when the user doses a task or declines a notification message, the mobile device may need to determine the number of tasks being executed and displayed, and the priority rankings of each task. The mobile device may further determine the display of each task according to the priority rankings and the user's settings. Details of the process may be referred to steps S1001-S1006 as previously described and are not repeated herein.

In certain embodiments, as desired, the user may also allow only one task, i.e., a major task, to be displayed on the screen, and icons of all other tasks to be arranged in the task menu. In this case, the tasks in the task menu, i.e., minor tasks, may send notification messages to the user, e.g., to show updates or request user's action. The display of the notification message may partially overlap with the display of the major task and the task menu. The display of the notification message may have a certain level of transparency so that the user may be able to see the status of the major task and the task menu.

In various embodiments of the present disclosure, the task being executed or opened may be indicated or shown by an icon of the task, on the screen. The icon may be shown in any suitable position on the screen and may appear different than the tasks/applications that are not being executed, so as to distinguish tasks being executed from tasks not being executed. In one embodiment, the icon of the task being executed may be shown in the task menu and may have a different color than the tasks not being executed. The task menu may be located at any suitable position on the screen.

In one embodiment, the task menu may be located at the bottom of the screen. The notification message may be displayed in any suitable position on the screen. In one embodiment, the notification message may be at the lower portion of the screen and may partially overlap with the display of the first-minor task and the task menu. The display of the notification message may have a certain level of transparency so that the user may be able to see the status of the first-level minor task and the task menu.

It should be noted that, in the present disclosure, the number of tasks to be displayed on the screen, i.e., 2, is only exemplary. In certain embodiments, the user may also be able to allow more than two tasks to be displayed on the screen at the same time by defining certain parameters in the mobile device. The user may define, e.g., a major task and a plurality of layers of minor tasks, and a maximum number of tasks to be displayed on the screen. Each task may have a certain priority ranking that can be used for determining if the task can be displayed on the screen or in the task menu. The user may continue to open desired tasks to be executed and displayed on the screen until the maximum number is reached. The user may also determine the portions of screen area for displaying the tasks. The progress may be similar to the progress shown in FIG. 10 and is not repeated herein.

The specific process to select major task, the first-level minor task, and the second-level minor tasks should not be limited by the embodiments of the present disclosure. In one embodiment, the portion to display the major task may be about two thirds of the screen area, and the portion to display the first-level minor task may be about one third of the screen area. The specific proportions to display the major task and the first-level minor task should not be limited by the embodiments of the present disclosure.

Figure 11:
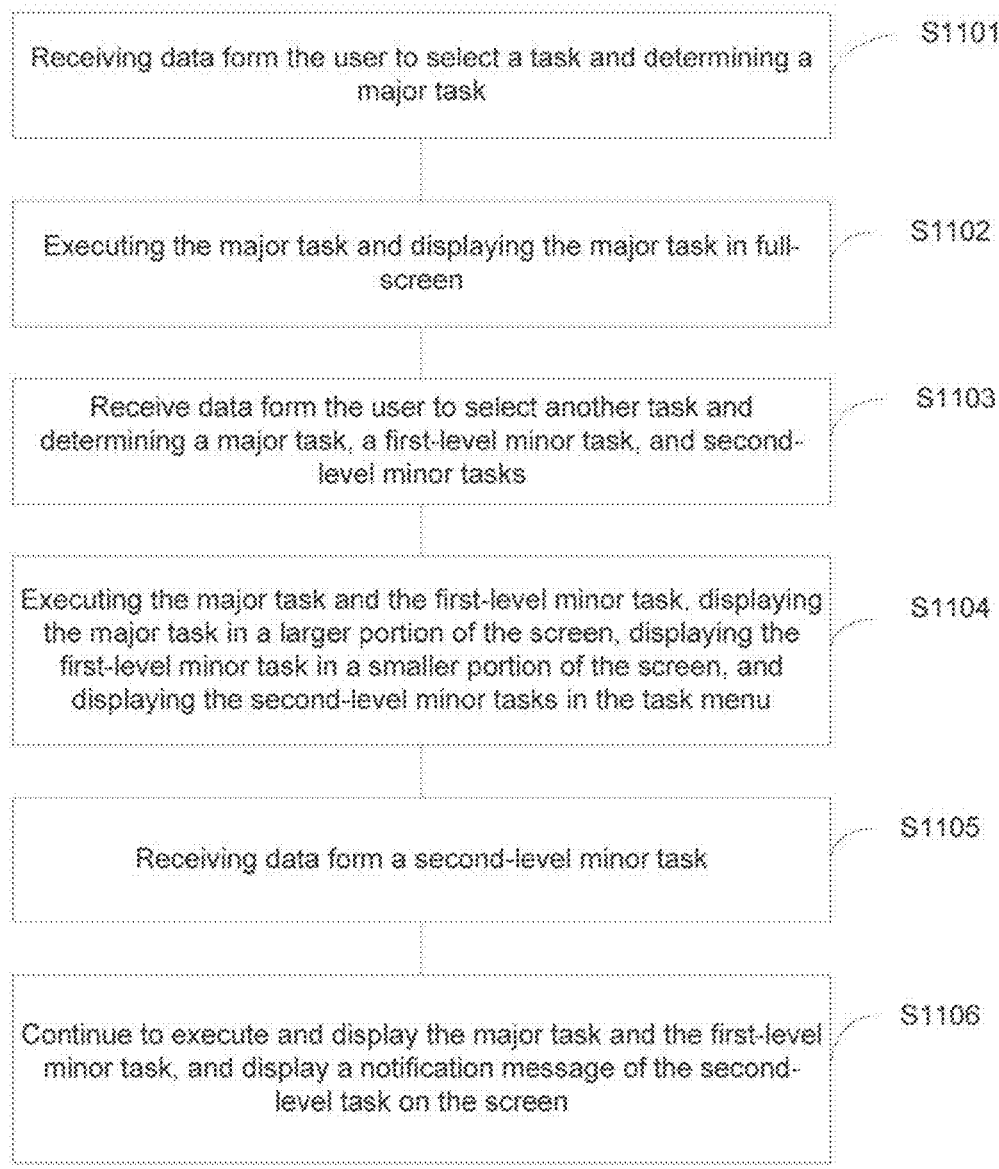
FIG. 11 illustrates another exemplary flow chart of an operation consistent with various disclosed embodiments of the present disclosure.

FIG. 11 illustrates an exemplary process the mobile device determines tasks of different priority rankings.

As shown in FIG. 11, in step S1101, at the beginning of a process, a mobile device may receive data to select a task and determine a major task. The data may be from the user or from a task, and may contain information for selecting a task. For example, the user may select a task or a task may generate a notification message that requires user's action, and after the user responds to the notification message, the task may be selected to open. In one embodiment, the task may be the only task being selected and the task may be the major task.

Figure 3:
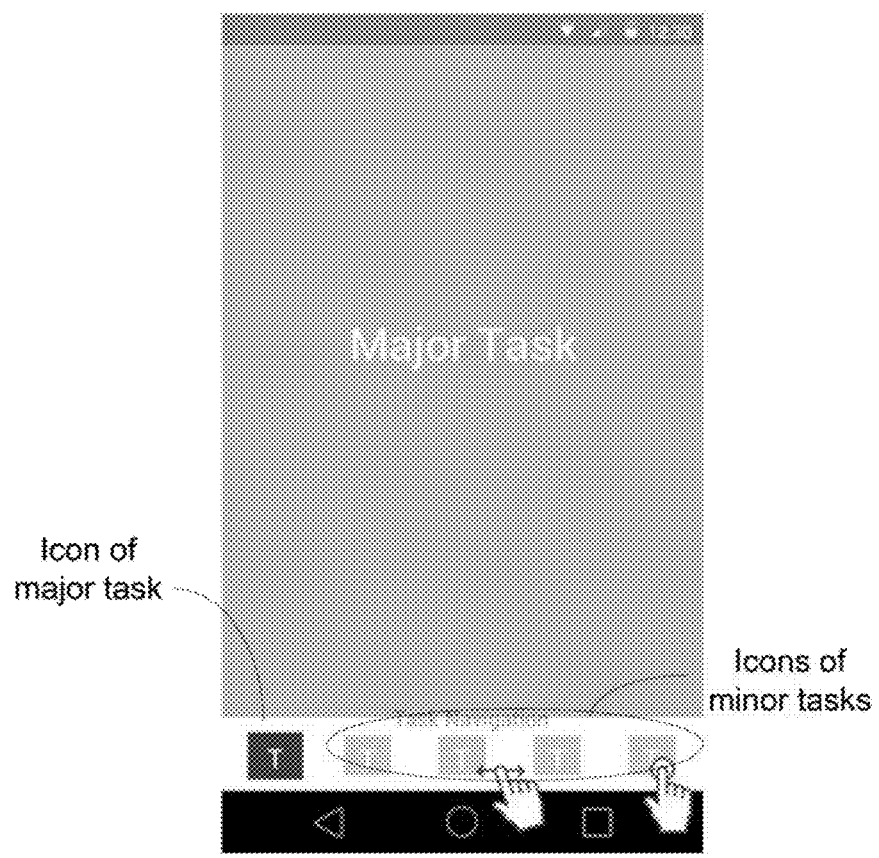
FIGS. 3-9 each illustrates an exemplary operation on a mobile device consistent with various disclosed embodiments of the present disclosure.

In step S1102, the mobile device may execute the task and display the major task in full-screen. In one embodiment, at this time, the major task may be the only task being executed and displayed, and the rest of the tasks on the mobile device may be arranged in the task menu for the user to navigate and choose. FIG. 3 illustrates an exemplary view of the screen when only a major task is being displayed on the mobile device.

As shown in FIG. 3, the status of a task, i.e., being executed/open or being idle/closed, may be shown by the icon of the task in the task menu. For example, the mobile device may have a touch screen, and a user may slide along (indicated by the double ended arrow) the task menu bar and choose (indicated by the touch point) a desired task to be executed. The first icon on the left of the task menu may represent the on-going major task and may appear to have a darker color than the icons of the tasks that are not being executed. The user may slide along the tasks not being executed to select a task to be executed next, or may close a task opened previously.

In step S1103, the mobile device may receive data to select another task and determine a major task, a first-level minor task, and second-level minor tasks.

In one embodiment, the priority ranking of a task may be determined according to the time it is opened in the mobile device. That is, the major task, executed in step S1102 may continue to be the major task, and the task selected in step S1103 may be a first-level minor task. The rest of the applications on the mobile device may be second-level minor tasks. The first-level minor task and the second-level-minor tasks may be arranged in the task menu.

Figure 4:
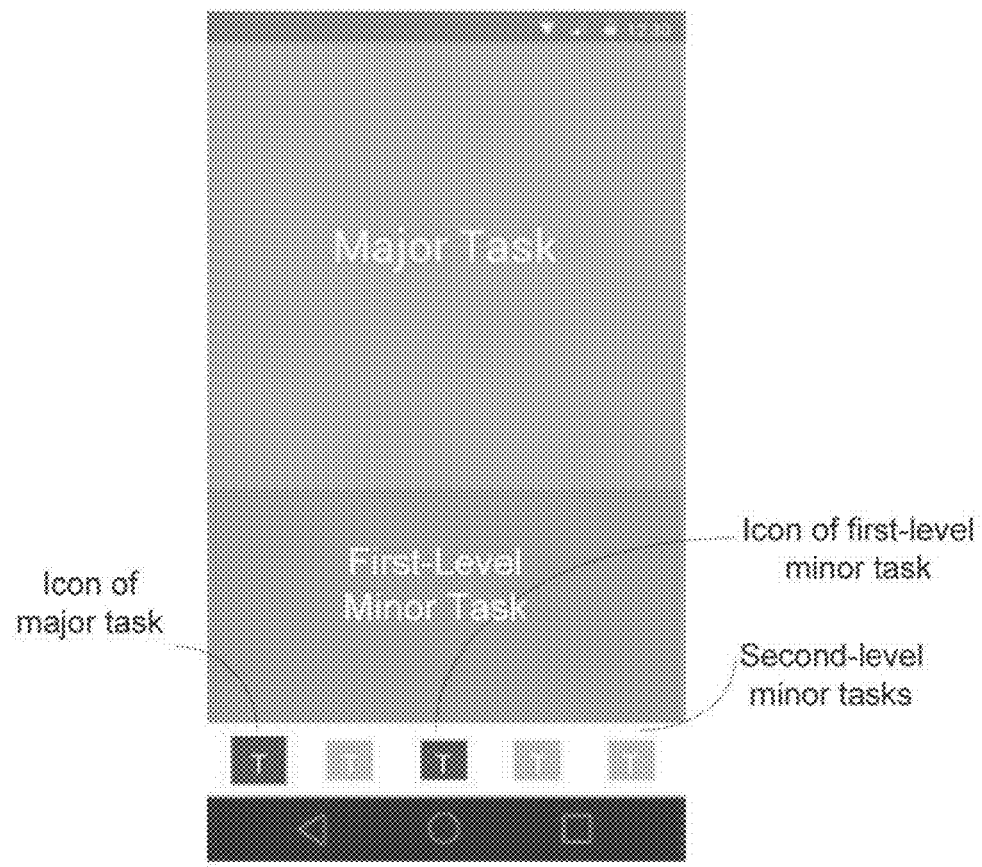

In step S1104, the mobile device may execute the major task and the first-level minor task, display the major task in a larger portion of the screen, display the first-level minor task in a smaller portion of the screen, and display icons of the major task, the first-level minor task, and the second-level minor tasks in the task menu. FIG. 4 illustrates an exemplary view of the screen when a major task and a first-level minor task are being executed.

As shown in FIG. 4, icons of the second-level minor tasks may be arranged in the task menu. In one embodiment, the portion for displaying the major task may be about two thirds of the screen area, and the portion for displaying the first-level minor task may be about one third of the screen area. The portion for displaying the major task may be above or below the portion for displaying the first-level minor task. In one embodiment, the portion for displaying the major task may be above the portion for displaying the first-level minor task.

As shown in FIG. 4, the status of the major task, the first-level minor task, and the second-level minor tasks may be shown in the task menu. In one embodiment, the icons of the major task and the first-level minor tasks, being executed, may have a darker color than the ions of the second-level minor tasks. The difference in colors may represent that the major task and the first-level minor task are being executed, and the second-level minor tasks are not being executed. In various embodiments, the specific way to indicate the status of a task should not be limited by the embodiments of the present disclosure, and the order of the ions may be arranged according to different applications and designs. It is desired that the screen of the mobile device can show the status of the tasks.

In step S1105, the mobile device may receive data to select a second-level minor task. The data may be, e.g., a selection of a task by the user, an update of status of the task, or a request for the user's action.

In step S1106, the mobile device may continue to execute and display the major task and the first-level minor task, and display a notification message of the second-level minor task on the screen.

Figure 5:
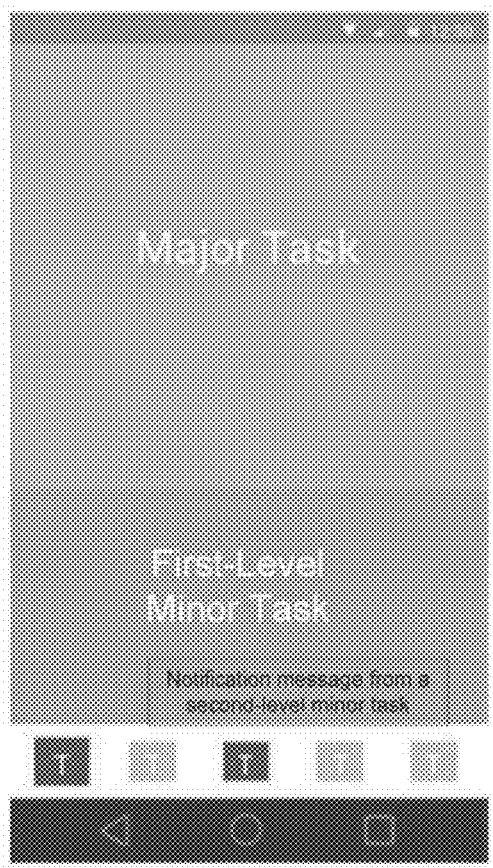

The data from the second-level minor task may be processed and the content of the data may be displayed on the screen as a notification message from the second-level minor task. FIG. 5 illustrates an exemplary view of the screen when a notification message from a second-level minor task is displayed on the screen. A notification message may be any suitable type of message such as a banner message or a pop-up alert box. As shown in FIG. 5, the notification message may be displayed when the major task and the first-level minor task are being executed and displayed normally. That is, the notification message of a second-level minor task may not interrupt the execution and display of the major task and the first-level minor task.

In practice, when the mobile device receives data to select/open a task, the mobile device may determine the priority ranking of the task, and display the task in the corresponding portion of the screen. In some embodiments, the user may be able to maintain the status of the major task and/or the first-level minor task by setting certain parameters in the mobile device, such that when the major task and/or the first-level minor task are on-going and being displayed in the screen, response to the notification messages from other tasks, e.g., second-level tasks, may not be able to interrupt the status of the major task and/or the first-level minor task. That is, when the major task and/or the first-level minor task are on-going and being displayed, a response to a notification message from another task may not affect the execution and display of the major task and/or the first-level minor task. Thus, the user can focus on the contents shown by the major task and/or the first-level minor task as desired, and receive information from other tasks.

It should be noted that, the process shown in FIG. 11 is only an example to illustrate the present disclosure. In practice, the user may arbitrarily open/close a task and decline a notification message. When the mobile device receives data that contains information to open/close a task or decline a notification message, the mobile device may determine the priority rankings of the on-going tasks, and determine the execution and display of each task, e.g., through steps S1001-S1006. Details are not repeated herein.

The disclosed system and method for the UX design are further illustrated in FIGS. 6-9.

Figure 6:
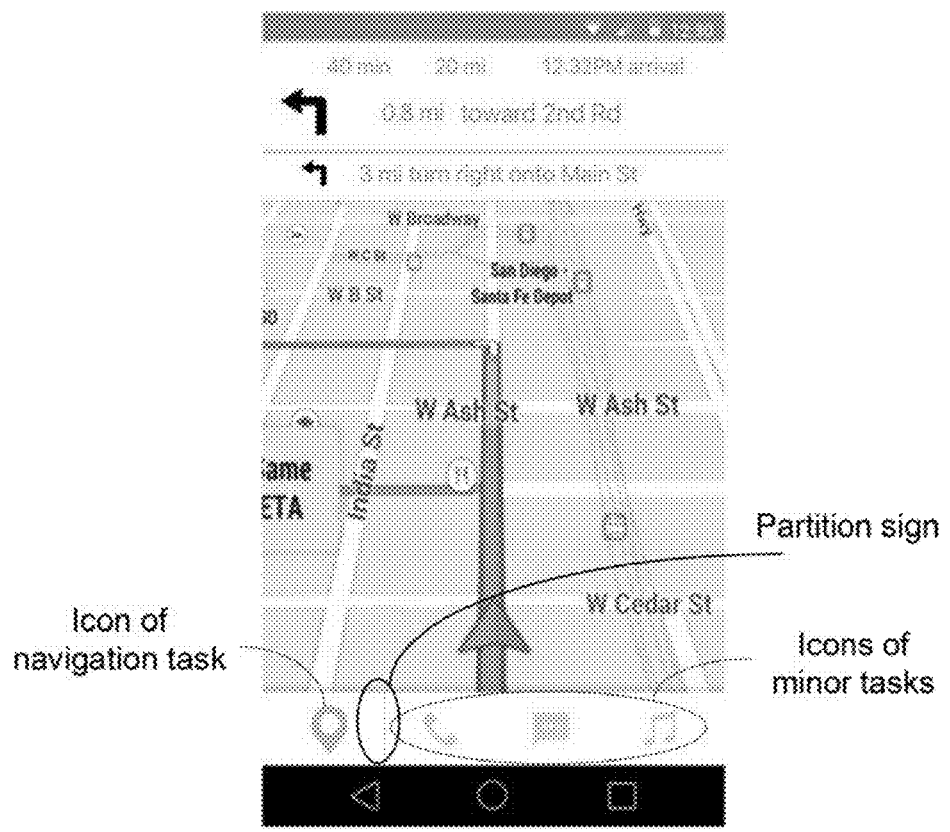

As shown in FIG. 6, a navigation application may be open as the only task being executed. The navigation application may be displayed in full-screen. The icon of the navigation application may be displayed at the left side of the task menu, indicating the navigation application is open and being executed. A plurality of other applications, e.g., phone calls, messaging, and music application, may be arranged in the task menu at the bottom of the screen. The user may slide along the task menu to see other applications. In one embodiment, the navigation may be the major task, and the other applications shown in the task menu may be minor tasks. Icons of the minor tasks, e.g., phone calls, messaging, and music application, may be displayed on the right side of the icon of the navigation task. In various embodiments, a partition sign or a line may be shown to separate the major task and the minor tasks, as shown in FIG. 6. For illustrative purposes, the partition sign is only labeled in FIG. 6.

Figure 7:

As shown in FIG. 7, when the navigation application is being executed, another application, e.g., a phone call, may be open. For example, the mobile device may be used to make an outgoing call or receive an incoming call. In one embodiment, the navigation application and the phone call may be the only two tasks being executed by the mobile device. The navigation application may be the major task and the phone call may be the first-level minor task. Icons of the minor tasks, i.e., the first-level minor task and the second-level minor tasks, may be displayed on the right side of the major task. The navigation application may continue to be executed, and may be displayed in a larger portion of the screen area. The phone call may be executed at the same time with the navigation application, and may be displayed in a smaller portion of the screen area. In one embodiment, the navigation application may be displayed above the phone call.

Figure 8:
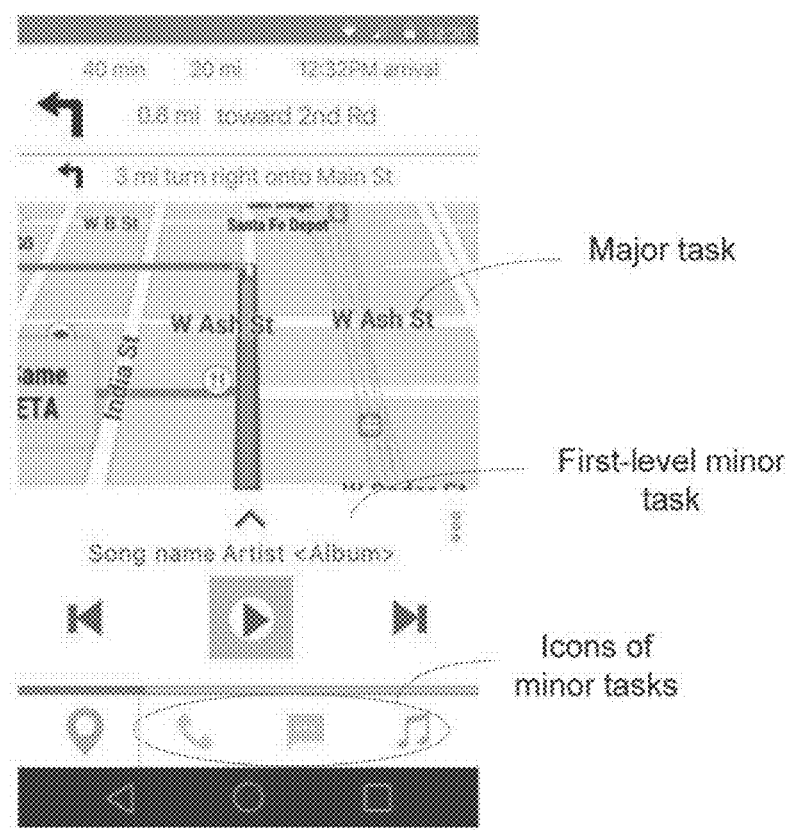

Also, as shown in FIG. 8, the major task may be the navigation application, and the first-level minor task may be a music application. The music application may be executed at the same time with the navigation application. The navigation application may be displayed in a larger portion of the screen area and the music application may be displayed in a smaller portion of the screen area. In one embodiment, the navigation application may be displayed above the music application.

In various embodiments, the arrangement of icons of minor tasks in the task menu may stay the same when different minor tasks are chosen to be executed as first-level minor tasks. Thus, it may be easier for the user to adapt to the order or arrangement of the icons of the minor tasks. The icon of the major task, displayed on the left side of the screen area, may be changed or adjusted to represent the major task being displayed.

As shown in FIGS. 6-9, in various embodiments, the icon of the navigation application may be displayed at the left side of the task menu, and the ions of a plurality of other applications, e.g., cons of the phone call, messaging, and music application, may be displayed on the right side of the ion the navigation application. The ions of the navigation application and the phone call may have a different color to indicate the navigation application and the phone call are open.

Figure 9:

As shown in FIG. 9, in one embodiment, the major task may be the navigation application, and the first-minor task may be a music application. Phone call may be a second-level minor task arranged in the task menu. The user may open the music application to play music when the navigation application is opened. The navigation application may be executed, and may be displayed in a larger portion of the screen area. The music application may be executed, and may be displayed in a smaller portion of the screen area. When the navigation application and the music application are both being executed, a notification message of the phone call may be displayed on the screen. The notification message may be triggered by an incoming call or an outgoing call. The user may be able to make the phone call without turning off the navigation application or the music application.

Figure 12:
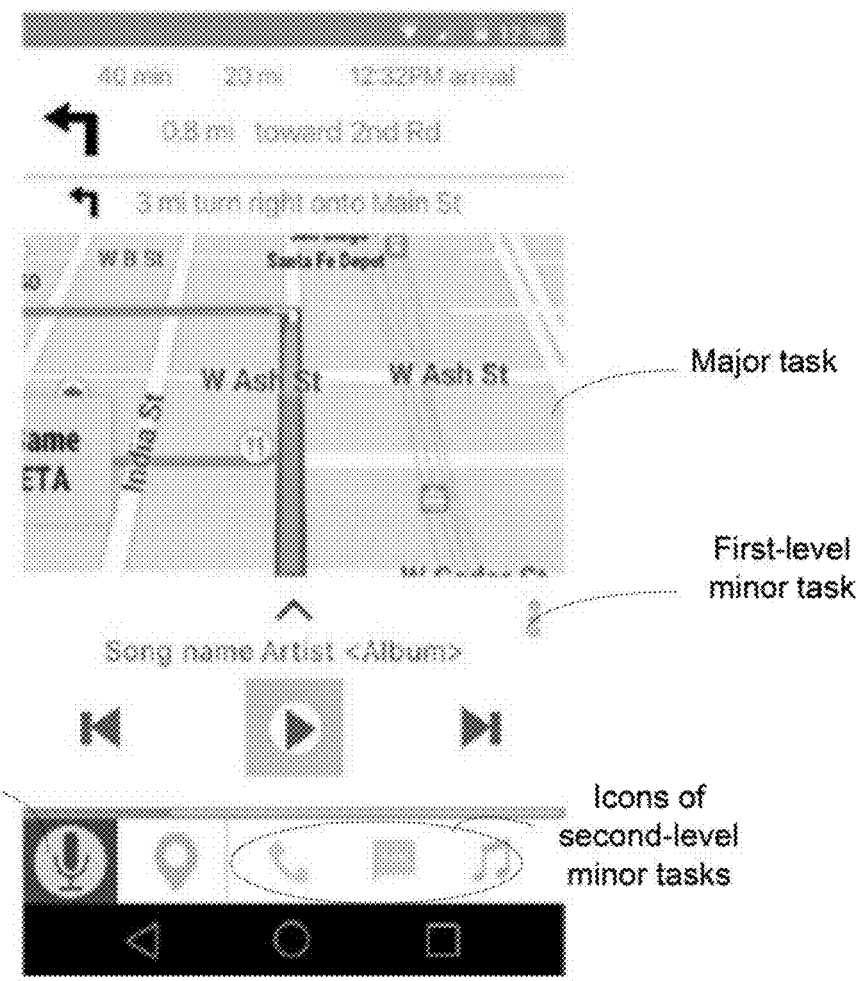
FIG. 12 illustrates an exemplary operation on a mobile device consistent with various disclosed embodiments of the present disclosure.

As an extension of the above multitasking UX design example for driving scenario (as shown in FIGS. 8, 9, and 12), voice control may be used to open or close tasks of different priority levels. Using voice control as part of the human-machine interaction allows a user to conduct any task without needing the task to be in the view, and it may add another layer of functional control. More importantly, voice control can directly reach the deep levels of a task that cannot be achieved by a (graphical user interface) GUI with one tap. For example, the user may directly command the mobile device to execute a function through voice control, instead of touching or tapping the mobile device a few times. In another example, as shown in FIG. 12, the user may command the mobile device to drive the user to a desired location or play a desired song from an album, and the user may not need to tap the mobile device several times to reach the desired tasks.

A user can direct ask the system to drive the user to a destination, and/or call someone or play a specific album, as shown in FIG. 12. For example, in the embodiment shown in FIG. 12, a user may user voice control to start a navigation application and/or a music application without tapping on the screen of the mobile device. The voice control icon or the microphone icon at the first of the left side of the task menu may indicate the user is interacting with the mobile device using voice control. The user's voice commands may be inputted directly into the mobile device to control the mobile device to perform desired functions, and the mobile device may turn on speaker to respond to the user's voice commands. In an example, the user may enable the voice control function by tapping a button on the mobile device or simply speak out a command. The mobile device may respond to the user's voice command by displaying the microphone icon on the left side of the task menu and displaying the major task being performed on the right of the microphone icon, indicating the voice control function has been enabled or the mobile device is starting to accept the user's voice commands. At the same time, the mobile device may perform certain functions, e.g., music, according to the user's commands. The mobile device may perform according to the user's commands, simultaneously keep accepting the user's voice commands, and updating the tasks being performed according to the user's voice commands. The user may disable the voice control function by tapping a button on the mobile device or simply speak out a command, so that the microphone icon may disappear from the task menu, and the icon of the major task may return to the first of the left side on the task menu.

Meanwhile, using GUI, a user may need to get to the corresponding functional interface, find the target object, and then take actions accordingly with one or more hierarchical interactions. Thus, combining the use of voice control and GUI, a user may start a desired application more conveniently at a desired time.

Voice interaction/control goes beyond the limitations of GUI, e.g., a user cannot reach a different hierarchy quickly when driving. Voice control may provide the functions in the UI structure and along the task flow at the same level. It may be critical for the system, most importantly for the user, to handle multitasking, especially when safety plays an important role during the task.

In various embodiments, voice control may be used to open and close tasks of different priority rankings and/or layers. The voice control may correspond to step S1001 for selecting a task. Through voice control, the user may directly select a desired application to open, without scrolling, sliding, or typing on the screen of the mobile device. That is, the user may control the mobile device without looking at or touching the mobile device, and the user may reach a task at a certain layer without the GUI of the mobile device.

Thus, the user may be able to define a set of applications/tasks that can be triggered/controlled by voice, and a set of applications/tasks that may be or may not be shown on the screen of the mobile device when being executed. Another layer of function control may be added to the mobile device. The user may open a desired application/task with voice so that the controlling of the mobile device may be more convenient and more efficient.

The disclosed UX design can be applied broadly to many cases that multiple tasks are accessible and important to the user when conducting one task. For example, when a user is on the road driving to a targeted destination to a short distance or on a road trip, the user may receive phone calls and messages, find parking, gas stations, and dinning, go sightseeing, etc. Without interrupting the ongoing navigation and/or map, the disclosed UX design may enable visualized direction to reduce driving stress and to ensure on-road safety. The disclosed UX design may provide the capability to allow the user handle the minor task without losing or missing the major task, i.e., map information. The disclosed UX design may be implemented in platforms and system level such as iOS and Android, and may be compatible with the existing applications. In addition, any suitable minor tasks can notify user with the status or related information when necessary, when both major task and minor task are displayed.

For example, as shown in FIGS. 6-9, the user may be driving, and the user may turn on a navigation application, which is displayed on the screen of the mobile device. The user may use voice control, i.e., give command through voice, to the mobile device, to turn on a music application, and select a desired song from a desired album to play. When the user wants to make an outgoing call or wants to pick up an incoming call, the user may use voice control to make an outgoing call or pick up an incoming call. The user may also user voice control to control certain functions of the mobile device, e.g., the search function. The user may use the search function to search for a desired application and/or a desired file.

The multitasking feature of the mobile device may provide a technical solution for performing multiple tasks at the same time. The user may not need to be interrupted or distracted from an on-going task when another task is requesting for user's action. As an example, when the user is driving and the navigation application is open on the mobile device, the user may be able to make a phone call or play music via the mobile device when looking at the map in the navigation application. Thus, driving may be safer, and the user may have improved user experience.

The multitasking feature may be applied in various applications on various platforms. For example, the multitasking feature may be implemented in various consumer-level applications, e.g., applications for watching TV, music entertaining, gaming, news reading, online shopping, and social networking. The multitasking feature may also be implemented in various enterprise-level applications that involve multitasking and internal communication, e.g., applications for IT administrative system monitoring, sales tools, customer relationship management (CRM) system, accounting environment, customer support systems, health care systems, and education. The multitasking feature may be implemented in any suitable operating system such as iOS and android. The mobile device that includes the multitasking feature may be any suitable device such as a phone and a tablet computer.

As mobile devices increase in functionality, a user may perform more tasks, even when on the move. The mental habit of dividing one's attention into many small slices has significant implications on how young people learn, reason, socialize, do creative work and understand the world. With increasing phenomenon of multitasking in both individual and social usage, the disclosed UX design with GUI plus voice control may help user conduct multitasking with mobile devices efficiently and effectively while using less workload and other cognitive resources to make a quick and sound decision to ensure the accuracy and safety.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A method for improving mobile-phone user experience (UX) design for multitasking with priority and layered structure, comprising:
    providing, by a mobile phone, a user interface;
    receiving, by the mobile phone, data for opening a task;
    determining, by the mobile phone, a priority ranking of the task, wherein the priority ranking comprises a highest priority layer and a minor task layer; and
    executing, by the mobile phone, the task and displaying the task on different portions of the user interface based on the priority ranking of the task,
    wherein:
    the task includes a major task having a highest priority ranking and a plurality of minor tasks having lower priority rankings, the plurality of minor tasks is categorized into at least first-level minor tasks and second-level minor tasks, the first-level minor tasks having a higher priority ranking than the second-level minor tasks;
    the priority ranking of the major task, the first-level minor tasks and the second-level minor tasks is determined based on a time the task is opened in the mobile phone;
    when the task is in the highest priority layer, displaying the task on a first portion of the user interface;
    when the task is in the minor task layer, displaying the task in a task menu of the user interface;
    the task menu of the user interface includes a first icon of the task in the highest priority layer and a second icon of the task in the minor task layer, and a partition sign is shown in the user interface to separate the first icon and the second icon.

2. The method according to claim 1, wherein:
    the major task is executed and displayed in full-screen of the screen area;
    the plurality of minor tasks is displayed in the task menu as icons each corresponding to a minor task;
    at least one of the icons is able to display a notification message of the corresponding task on the screen area; and
    the minor task corresponding to the notification message is opened by responding to the notification message by a user such that the minor task corresponding to the notification message is being executed and displayed at a same time with at least the major task.

3. The method according to claim 1, wherein the major task is executed and display on a larger portion of the screen area, and at least one of the first-level minor tasks is executed and displayed on a smaller portion of the screen area.

4. The method according to claim 3, wherein:
    at least one of the second-level minor tasks is displayed in the task menu as icons each corresponding to a second-level minor task;
    at least one of the icons is able to display a notification message of the corresponding task on the screen area; and
    the second-level minor task corresponding to the notification message is opened by responding to the notification message such that the second-level minor task corresponding to the notification message is being executed and displayed at a same time with at least the major task.

5. The method according to claim 4, wherein the task corresponding to the notification message is being executed and displayed at the same time with at least the major task and at least one first-level minor task.

6. The method according to claim 1, wherein voice control is used for the receiving data for opening a task.

7. The method according to claim 1, wherein the partition sign is a line shown on the user interface of the mobile phone to separate the first icon of the task in the highest priority layer and the second icon of the task in the minor task layer.

8. A system for improving mobile-phone user experience (UX) design for multitasking with priority and layered structure, comprising a memory processor configured for:
    providing, by a mobile phone, a user interface;
    receiving, by the mobile phone, data for opening a task;
    determining, by the mobile phone, a priority ranking of the task, wherein the priority ranking comprises a highest priority layer and a minor task layer; and
    executing, by the mobile phone, the task and displaying the task on different portions of the user interface based on the priority ranking of the task,
    wherein:
    the task includes a major task having a highest priority ranking and a plurality of minor tasks having lower priority rankings, the plurality of minor tasks is categorized into at least first-level minor tasks and second-level minor tasks, the first-level minor tasks having a higher priority ranking than the second-level minor tasks;
    the priority ranking of the major task, the first-level minor tasks and the second-level minor tasks is determined based on a time the task is opened in the mobile phone;
    when the task is in the highest priority layer, displaying the task on a first portion of the user interface;
    when the task is in the minor task layer, displaying the task in a task menu of the user interface;
    the task menu of the user interface includes a first icon of the task in the highest priority layer and a second icon of the task in the minor task layer, and a partition sign is shown in the user interface to separate the first icon and the second icon.

9. The system according to claim 8, wherein:
    the major task is executed and displayed in full-screen of the screen area;
    the plurality of minor tasks is displayed in the task menu as icons each corresponding to a minor task;

at least one of the icons is able to display a notification message of the corresponding task on the screen area; and the minor task corresponding to the notification message is opened by responding to the notification message by a user such that the minor task corresponding to the notification message is being executed and displayed at a same time with at least the major task.

10. The system according to claim 8, wherein the major task is executed and display on a larger portion of the screen area, and at least one of the first-level minor tasks is executed and displayed on a smaller portion of the screen area.

11. The system according to claim 10, wherein:
at least one of the second-level minor tasks is displayed in the task menu as icons each corresponding to a second-level minor task;
at least one of the icons is able to display a notification message of the corresponding task on the screen area; and
the second-level minor task corresponding to the notification message is opened by responding to the notification message such that the second-level minor task corresponding to the notification message is being executed and displayed at a same time with at least the major task.

12. The system according to claim 11, wherein the task corresponding to the notification message is being executed and displayed at the same time with at least the major task and at least one first-level minor task.

13. The system according to claim 8, wherein voice control is used for the receiving data for opening a task.

14. A non-transitory computer-readable medium containing executable computer program for, when being executed by a memory processor, improving mobile-phone user experience (UX) design for multitasking with priority and layered structure, the method for multitasking comprising:
providing, by a mobile phone, a user interface;
receiving, by the mobile phone, data for opening a task;
determining, by the mobile phone, a priority ranking of the task, wherein the priority ranking comprises a highest priority layer and a minor task layer; and
executing, by the mobile phone, the task and displaying the task on different portions of the user interface based on the priority ranking of the task,
wherein:
the task includes a major task having a highest priority ranking and a plurality of minor tasks having lower priority rankings, the plurality of minor tasks is categorized into at least first-level minor tasks and second-level minor tasks, the first-level minor tasks having a higher priority ranking than the second-level minor tasks;

the priority ranking of the major task, the first-level minor tasks and the second-level minor tasks is determined based on a time the task is opened in the mobile phone;

when the task is in the highest priority layer, displaying the task on a first portion of the user interface;

when the task is in the minor task layer, displaying the task in a task menu of the user interface;

the task menu of the user interface includes a first icon of the task in the highest priority layer and a second icon of the task in the minor task layer, and a partition sign is shown in the user interface to separate the first icon and the second icon.

15. The non-transitory computer-readable medium according to claim 14, wherein:
the major task is executed and displayed in full-screen of the screen area;
the plurality of minor tasks is displayed in the task menu as icons each corresponding to a minor task;
at least one of the icons is able to display a notification message of the corresponding task on the screen area; and
the minor task corresponding to the notification message is opened by responding to the notification message by a user such that the minor task corresponding to the notification message is being executed and displayed at a same time with at least the major task.

16. The non-transitory computer-readable medium according to claim 14, wherein the major task is executed and display on a larger portion of the screen area, and at least one of the first-level minor tasks is executed and displayed on a smaller portion of the screen area.

17. The non-transitory computer-readable medium according to claim 16, wherein:
at least one of the second-level minor tasks is displayed in the task menu as icons each corresponding to a second-level minor task;
at least one of the icons is able to display a notification message of the corresponding task on the screen area; and
the second-level minor task corresponding to the notification message is opened by responding to the notification message such that the second-level minor task corresponding to the notification message is being executed and displayed at a same time with at least the major task.

* * * * *